United States Patent Office 3,250,378
Patented May 10, 1966

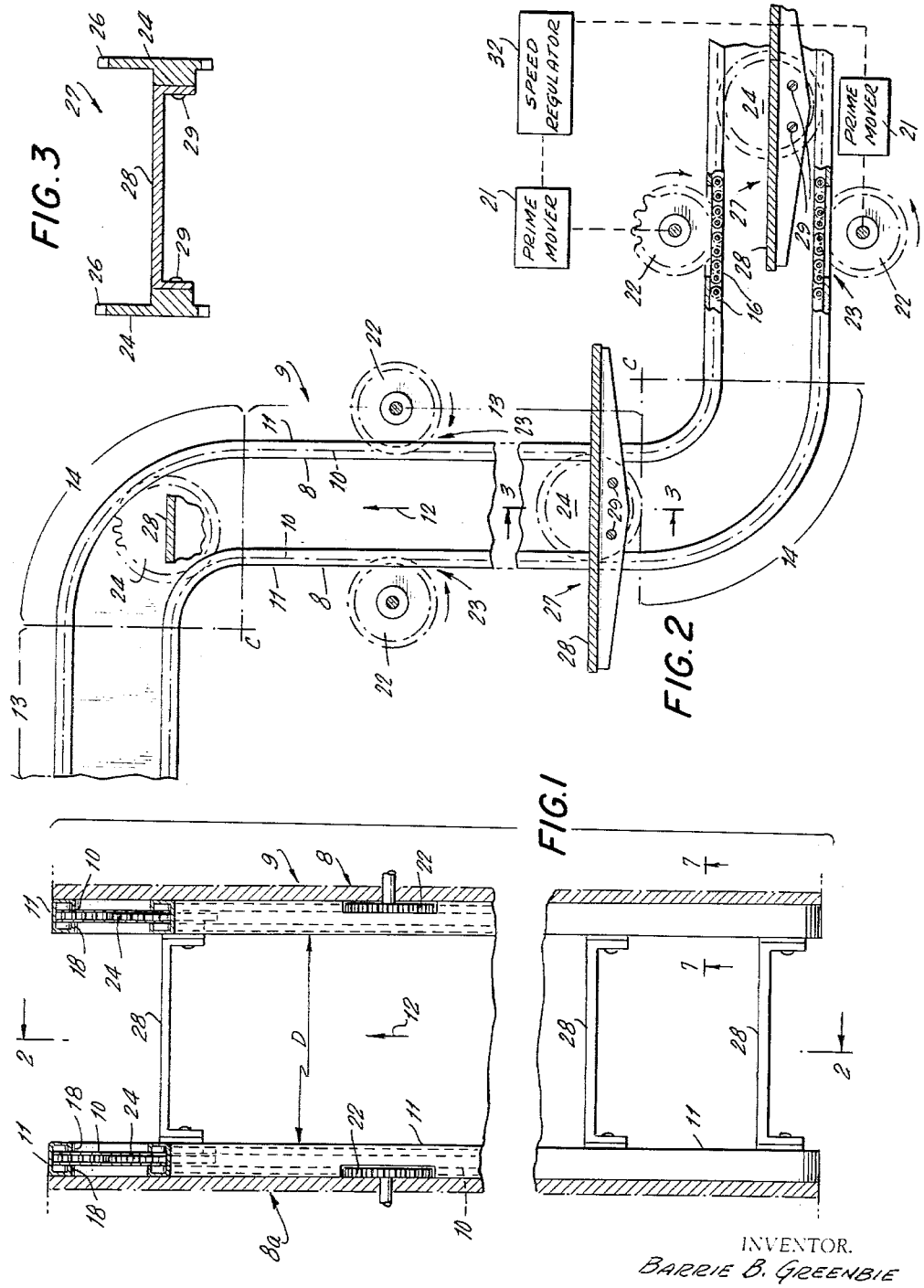

3,250,378
SHELF-TYPE CONVEYING APPARATUS
Barrie B. Greenbie, 12 Remsen St., Brooklyn, N.Y.
Filed June 17, 1964, Ser. No. 375,884
5 Claims. (Cl. 198—154)

The present invention relates to conveying or transporting apparatus and more particularly to such apparatus for conveying or transporting a wide variety of materials through a curving path of travel.

Reference herein to a conveying apparatus is intended to relate the apparatus of the present invention to a principle intended industrial application, namely, the carrying or conveying of material by said apparatus from one point to another point along a defined path of travel. However, as is hereinafter described, an essential feature of the present apparatus is an ability to maintain a predetermined orientation during movement along said path, particularly through change in curvature of said path, in the member of said apparatus being moved. Consistent with this capability the apparatus may additionally be used in a wide range of industrial environments, as for example in a control mechanism wherein an actuating member is carried on said moving member (as distinguished from cargo) and in a fixed orientation brought into contact with diverse means located along the path of movement for actuating said means. Thus, such reference to the material conveying art as contained herein is solely for convenience in describing a preferred embodiment of the apparatus of the present invention and not intended as a limitation on the scope of the invention contemplated herein.

The capability of handling a wide variety of material whether it be bulky, compact, solid, liquid, or of other diverse character or nature, and the transportation of such material along a curving path of travel imposes on a conveying apparatus, among other requirements, the requirement that the material conveyed have a controlled angular position during all points of travel, particularly along those portions of changing curvature.

An important object of the present invention is to provide an improved conveying apparatus in which the material is capable of being conveyed in any predetermined fixed angular position, and in which adjustment automatically occurs to maintain this fixed angular position during travel along changing curvature in the path of travel of the conveying apparatus.

Another object is to provide a highly flexible conveying apparatus in which the angular position or orientation of the transported material may readily be changed.

A still further object is to provide a conveying apparatus in which there is flexible control over the orientation or angular position of the conveyed material such that as desired the conveyed material may be maintained intact and at any point along its path of travel the orientation of said material may be changed so as to discharge the material from the conveying apparatus.

Various other objects and advantages will appear from the following description of one embodiment of the invention, and the novel features will be particularly pointed out hereinafter in connection with the appended claims.

Included within the scope of the present invention is a conveyor having a pair of parallel tracks defining the conveyor path of travel. Each track is made up of a pair of parallel rails or frame members having on endless driving chain which in the operation of the conveyor is driven at the same linear speed lengthwise along each frame member. Spanning the tracks and in driving engagement with the driving chains is a driven member which includes a suitable support for the material being conveyed. More particularly, in a preferred embodiment, the driven member has two gears at its opposite ends, the peripheral teeth of each of which are in driving engagement with the parallel driving chains of each track. During a change in curvature there is a natural advancement, in the direction of travel, of the driving chains nearest the center of the curvature relative to that of the remote driving chains, and this is effective in reorientating the drive engagement of the chains with the peripheral teeth of the driven member gears to maintain a fixed angular position of the driven member during travel through this change in curvature.

The invention will be better understood when considered in connection with the accompanying specification and drawings forming a part thereof, in which:

FIG. 1 is a fragmentary plan view of a preferred embodiment of a conveying apparatus according to the present invention;

FIG. 2 is a side view, in section, taken along lines 2—2 of FIG. 1;

FIG. 3 is an isolated view of a typical material conveying member, in cross section, taken on lines 3—3 of FIG. 2;

Figure 4:
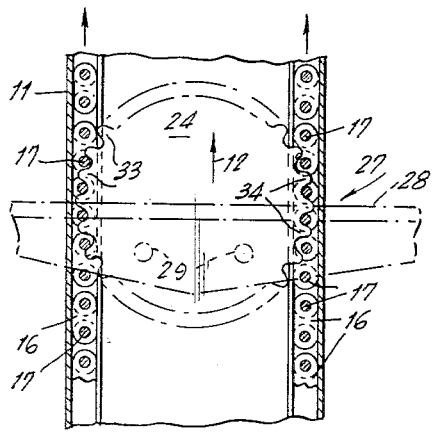
FIGS. 4, 5 and 6 are fragmentary views, in cross section, of such material conveying member, at various points in its path of travel, and with portions thereof in phantom perspective.

A preferred embodiment of the conveying apparatus of the present invention, generally designated 9, is constructed of four identical frame members 11, each housing an identical endless driving chain 10, and each pair of which forms a conveyor track 8 and 8a defining a fixed path of travel 12 through which material is conveyed or transported by the apparatus 9. Suitable support structure (not shown) attached in a conventional manner to the parallel tracks 8 and 8a will be understood to support these tracks and also the frame members 11 thereof at the fixed distances D and D' from each other, respectively, along the entire conveyor path of travel 12. Moreover, the overall shape or configuration of the path of travel 12 may vary to a wide degree as a function of any combination of conveyor straight or curved sections 13 and 14 as illustrated in FIG. 2.

Figure 7:
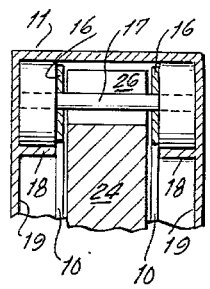
FIG. 7 is a fragmentary view, in cross section, taken on lines 7—7 of FIG. 1.

Each endless driving chain 10 will be understood to be of conventional construction having a series of lengthwise disposed links 16 connected one to the other by cross pins 17. As best shown in FIG. 7, each chain 10 is retained by a flange 18 extending inwardly from opposite walls 19 of each frame member 11 such that each chain is in an operable condition to be driven lengthwise within said frame member. As shown diagrammatically in FIG. 2, a prime mover 21 having an associated driving gear 22 in driving engagement as at 23 with each driving chain 10 is utilized to provide this movement to the driving chains. Additionally, it is contemplated that this movement will be imparted to a suitable driven member of the conveyor 9 through a driving connection made by an appropriate portion of said driven member extending through the clearance left between the retaining flanges 18. In the instant case, and as will be more particularly described subsequently, an essential component of the driven member is a conventional sprocket or gear 24 having peripheral teeth 26 adapted to engage with the cross pins 17 of each driving chain 10 and accordingly be carried by said chain along the conveyor tracks 8 and 8a.

Proceeding now to the description of a preferred embodiment of the driven member of the present invention, it will be understood that any number of such members may be employed and spaced as desired along the path of travel 12 of the conveying apparatus 9. The operation and construction of such members will be understood to be identical, and thus reference to the operation and construction of one such member shall be deemed adequate for purposes of the present invention. As best shown in FIGS. 2 and 3, each driven member, more particularly designated 27, consists of a material support platform 28 mounted as by bolts 29 between a pair of gears 24. It will be understood that the width of platform 28 is approximately equal to the distance D between the conveyor tracks 8 and 8a and that the diameter of each gear 24 equals the distance D' between the frame members 11 of each conveyor track or more particularly, the distance between the driving chains 10 therein. Thus, as previously mentioned, when operably disposed on the conveyor tracks 8 and 8a, the peripheral teeth 26 of the gears 24 are adapted to engage with the cross pins 17 of the driving chains 10. As a consequence, simultaneous movement of the driving chains 10 while the driven member 27 is engaged therewith will move said driven member along the path of travel 12 circumscribed by the conveyor tracks 8 and 8a. Assuming movement at the same linear speed, the driving chains 10 will in an obvious manner carry the driven member 27 through straight conveyor sections 13 without change in the angular position or orientation of the fixedly mounted material support platform 28. Additionally, and in accordance with the teachings of the present invention, there will be no change in this fixed angular position or orientation of the support platform 28 during travel of the driven member 27 through a curved conveyor section 14.

Figure 5:
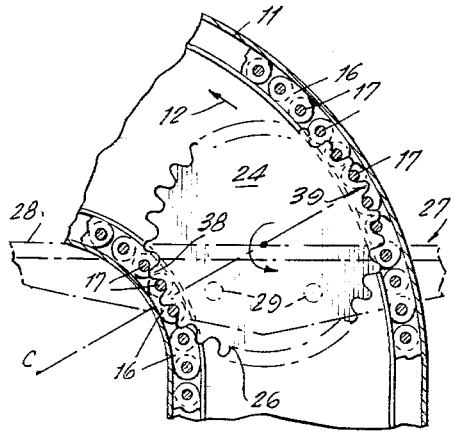
Figure 6:
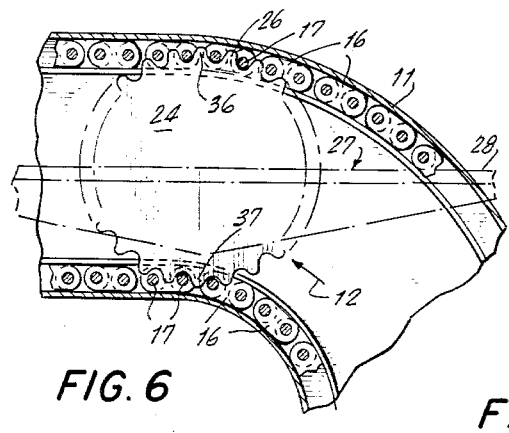

As is best illustrated in FIGS. 4, 5 and 6, the angular position of the driven member 27 through a curving section of travel is unchanged as is the angular position or orientation of the support platform 28 fixedly mounted thereon. In order to maintain this fixed angular position of the support platform 28 it is necessary that there be a change in the location of the driving engagement of the chains 10 about the periphery of the gears 24. That is, whereas in the vertical straight section 13 of FIG. 4 the driven member 27 is carried along with the chains 10 mainly due to the engagement therewith of the diametrically opposite peripheral gear teeth 33 and 34, in the horizontal straight sections 13 of FIG. 6 it is the diametrically opposite peripheral gear teeth 36 and 37 that make this driving connection or engagement with the chains 10. Assuming travel of the chains 10 at the same linear speed, this relocation of the driving engagement of the chains 10 along the periphery of the gears 24 occurs as a result of the change in the relative positions of the respective chains 10 of each track 8 and 8a with respect to the gears 24. That is, the inner chain 10 of each track (in relation to the center of curvature C) advances in position, in the direction of travel, relative to the outer chain 10, resulting in a tooth-by-tooth relocation of the driving engagement of the chains 10 with the peripheral teeth 26 of the gears 24. Thus, it is seen that the driving engagement of the teeth 33 and 34 of FIG. 4 has shifted partway along the periphery of the gears 24 to the teeth 38 and 39 in FIG. 5, and finally to the gear teeth 36 and 37 upon entrance of the driven member 27 into the horizontal straight conveyor section 13 of FIG. 6.

In the foregoing description of the operation of conveying apparatus 9 of the present invention it was assumed that the driving chains 10 operating in the tracks 8 and 8a were driven through their associated frame members 11 at the same linear speed to maintain the support platform 28 in a fixed angular position during all points of travel. On the other hand, if it is desired to discharge the conveyed material from the support platform 28 this is easily accomplished by operating the driving chains 10 at different linear speeds. For example, merely by driving the lower driving chains 10 (as depicted in FIG. 2) of the tracks 8 and 8a at the same, but a greater linear speed than the other driving chains will in an obvious manner cause clockwise rotation of the driven member 27 and thus tilt the support platform 28 mounted thereon so as to discharge the conveyed materials (not shown) from the support platform 28. Control over the relative linear speeds at which the driving chains 10 are driven along the tracks 8 and 8a, whether they be equal or different for the purposes of material discharge as just described, is obtained by the well known operation of a speed regulator 32 controlling operation of the prime movers 21.

It will be understood that the various elements hereinabove described in connection with the illustrated preferred embodiment of the present invention may be widely modified to suit a wide range of industrial applications. For example, the intended industrial application may dictate use of storage shelves, bins, trays, hooks or other such material support or carrying means other than the platform 28. Or the intended industrial application may dictate another type of driven and driving element, other than the herein described gear and driving chain arrangement, as for example, a wheel and driving friction belt, the substitution of which is considered obvious from the foregoing description of the illustrated preferred embodiment of the present invention. Accordingly, it will be understood that the invention is not to be limited to the specific construction, form or arrangement or parts shown, but that they may be widely modified within the invention defined by the claims.

What is claimed is:

1. In a material conveying apparatus including a support means for said material and means for driving the support means along a curving path of travel, an improved means for automatically maintaining a predetermined fixed angular position of the material support means during changes in curvature of the path of travel, said improved means including spaced, substantially parallel driving means defining said path of travel and adapted to be driven at the same linear speed, a driven member operatively engaged with said driving means and supported solely by said engagement with said driving means, said material support means being fixedly mounted on said driven member and movable therewith, whereby during a change in curvature in the path of travel the advanced position in the direction of travel of the driving means nearest the center of said curvature as compared with that of the driving means remote therefrom effectively changes the location of the operative engagement of said driving means with said driven member for maintaining the fixed angular position of the material support means.

2. A material conveying apparatus as claimed in claim 1 wherein said driving means is comprised of a plurality of driving chains each of which is disposed for longitudinal movement through an associated support frame defining said path of travel, and the material support means of said driven member has gears mounted on opposite ends thereof in engagement with said driving chains.

3. In a material conveying apparatus including a support means for said material and means for driving the support means along a curving path of travel, an improved means for automatically maintaining a predetermined fixed angular position of the material support means during changes in curvature of the path of travel, said improved means including a pair of spaced, substantially parallel tracks defining said path of travel, each track being comprised of a pair of spaced, substantially parallel frame members and a driving chain disposed for longitudinal movement through each frame member and adapted to be driven at the same linear speed, a driven member operatively engaged at its opposite ends between the driving chains of each track and supported solely by said engagement with said driving chains, said material support means being fixedly mounted on said driven member and movable therewith, whereby during a change in curvature in the path of travel the advanced position in the direction of travel of the driving chains of each track nearest the center of said curvature as compared with that of the driving chains remote therefrom effectively changes the location of the chain engagement with said driven member for maintaining the fixed angular position of the material support means.

4. In a material conveying apparatus including a support means for said material and means for driving the support means along a curving path of travel, an improve means for automatically maintaining a predetermined fixed angular position of the material support means during changes in curvature of the path of travel, said improved means including a pair of spaced, substantially parallel tracks defining said path of travel, each track being comprised of a pair of spaced, substantially parallel frame members and a driving chain disposed for longitudinal movement through each frame member, means for driving said driving chains including prime mover means having a driving gear in driving engagement with each driving chain and speed regulator means for regulating the linear speed of travel of said driving chains, and a pair of gears operatively disposed on said conveyor tracks such that the peripheral teeth of said gears are in driving engagement with said track driving chains, said material support means being fixedly mounted between said gears and movable therewith, whereby operating the driving chains at the same linear speeds produces during a change in curvature in the path of travel an advancement in position in the direction of travel of the driving chains of each track nearest the center of said curvature as compared with that of the driving chains remote therefrom and effectively changes the location of the driving engagement between said peripheral teeth and driving chains for maintaining the fixed angular position of the material support means.

5. A material conveying apparatus as claimed in claim 4 having a plurality of identical driven members spaced along the path of travel of said conveyor tracks and each of which is in driving engagement with the driving chains of said tracks.

References Cited by the Examiner

UNITED STATES PATENTS 2,830,714   4/1958   Youtz _____ 214—16.12

FOREIGN PATENTS 260,397   7/1949   Switzerland.

EVON C. BLUNK, *Primary Examiner.*

RICHARD E. AEGERTER, *Examiner.*